UNITED STATES PATENT OFFICE.

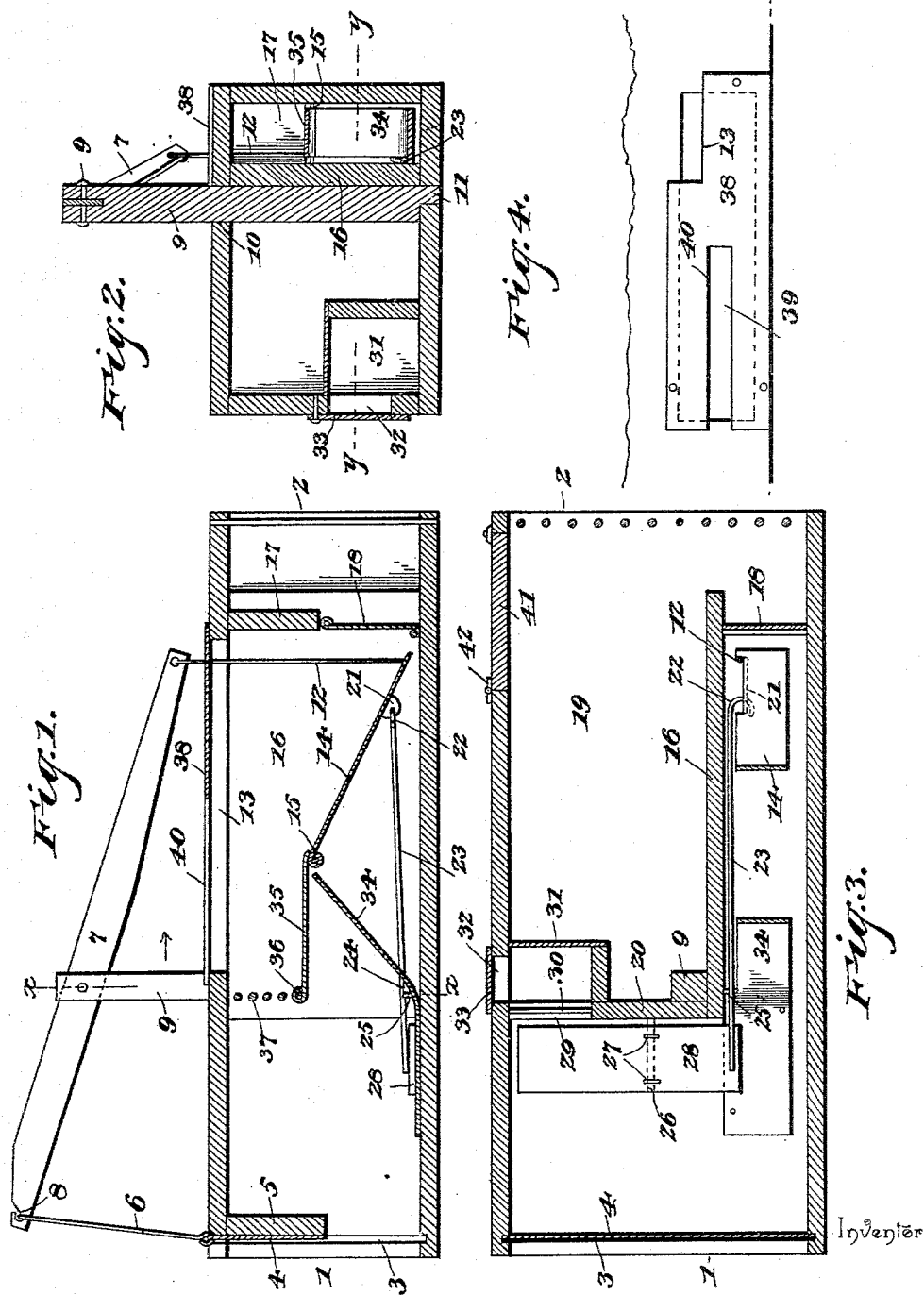

EMANUEL PETERS, OF GUIDE ROCK, NEBRASKA.

ANIMAL-TRAP.

SPECIFICATION forming part of Letters Patent No. 531,965, dated January 1, 1895.

Application filed March 9, 1894. Serial No. 503,027. (No model.)

*To all whom it may concern:*

Be it known that I, EMANUEL PETERS, a citizen of the United States, residing at Guide Rock, in the county of Webster and State of Nebraska, have invented a new and useful Animal-Trap, of which the following is a specification.

My invention relates to that class of animal traps wherein means are provided for resetting the trap by the operations of the victim; and the principal object contemplated by my invention is to so improve the construction of these devices that the operation of resetting will be surer and prompter than ordinarily.

A further object is to provide means for expediting the closing of the trap after the entry of the game, thereby reducing the chances of his escape.

Other objects, such as simplicity and durability, are contemplated, and the attainment of all will be apparent upon an understanding of my invention.

In the accompanying drawings: Figure 1 represents a longitudinal section of my improvements, taken through the resetting plate. Fig. 2 is a cross-section taken through the lever for closing the trap on line $x$—$x$ Fig. 1. Fig. 3 is a horizontal section on the line $y$—$y$ of Fig. 2. Fig. 4 is a plan view of a portion of the trap top.

The body of the trap is constructed preferably rectangular in shape, and provided with the open front end 1, and with the grating-closed rear end 2. Formed in the edges of the body, adjacent to the end 1, are the grooves 3, in which the sliding door 4 is arranged and adapted to reciprocate. The door 4 is of a width equal to that of the body, while its height is equal to about one-half the height of the body, the remaining space being filled by the end-piece 5, which is located above the door when closed. Connected to the upper edge of the door is the wire 6, which extends upwardly and over the front end of the lever 7, the said end of lever 7 being notched at 8 to receive the wire. The lever 7 is fulcrumed to the upper end of the standard 9, which is in turn passed through the opening 10 in the top of the body and provided at its lower end with the stud 11, which fits into a corresponding opening in the floor of the body. From the fulcrum of the lever 7 it extends rearwardly to a point near the rear end of the body, where it is pivotally attached to the downwardly-extending wire 12. Formed in the upper portion of the body, and extending from a point near the standard 9 to the rear end of the lever 7, is the slot 13, through which the wire 12 passes into the interior of the body, and is secured at its lower end to the free end of the plate 14. The plate 14 is, in turn, pivoted to the spindle 15, which is secured in the right-hand side of the body, and in the partition 16 of the same, so that the plate is allowed to swing, on a horizontal axis and in a vertical line, throughout the vertical extent of the passage left between the right-hand side of the body and the partition 16.

Located just beyond the free end of the plate 14 is the second partition, 17, which has its lower side cut away to form an opening in which the swinging plate 18 is arranged. Plate 18 is pivoted at its upper edge and is arranged to be capable of swinging rearwardly unrestrained, but incapable of swinging forwardly, thus allowing the victim of the trap to pass the plate when moving rearwardly, but preventing his return.

The plate 18 opens into a large chamber 19, bounded by the grating 2, the partitions 16 and 20, and the left-hand side of the body. The partition 20 is located near the front end of the body and extends from the front extremity of the partition 16, laterally, to the left-hand side of the body, thus dividing the body into two main compartments.

Formed on the plate 14, near its free end, is the downwardly-extending lug 21, which is slotted to receive the arm 22 of the locking-bar 23, whereby a pivotal connection between the two is effected. This device, bar 23, consists of a long piece of stout wire extending from the free end of plate 14 forwardly to a point beyond the end of partition 16, and it has formed on its under side, just to the rear of said end, the notch 24. This notch is adapted to engage with the stud 25, which is secured to the bottom of the body directly adjacent to the partition 16; and the notch 24 is arranged on the bar 23 at such a point that when the plate 14 is down and resting on the floor of the body, it (the notch) will be in position to lock with stud 25, thus preventing the raising of the plate, for, to effect this raising, the free end of the plate would have to swing in the arc of a circle, which would necessitate a slight outward movement of the bar, and which movement is rendered impossible owing to its relations with the stud 25.

Extending transversely across the body of the trap, and fulcrumed to the floor thereof by means of the roll-bar 26 and yokes 27, is the trip-lever 28. This lever is of an extended width so as to permit the trap's victim to stand or partly stand thereon, and has its short, right-hand arm located under the forward end of the bar 23, so that when the lever 28 is rocked on the roll-bar 26, the bar 23 will be raised, and disengaged from the stud 25. The left-hand arm of the lever 28 is longer than its companion and is arranged parallel with the front side of partition 20, with its end directly opposite the bait box.

The bait box consists of a square opening 29 formed in the partition 20, and directly over the long arm of lever 28, and provided with the gratings 30, whereby the bait is kept from the victim. Located on the rear side of the partition 20, and surrounding the opening 29, is the box 31, in which the bait is placed through the medium of the opening 32. This opening 32 is formed in the left-hand side of the body and provided with a cover or lid 33, hinged at its upper end and arranged to movably hang before the opening. By this means the bait is held in the sight of the game, but in such a way that they cannot reach it, all of which is for a purpose that will hereinafter appear.

Secured to the flooring of the body, at a point near the lever 28, is the inclined way 34, which proceeds rearwardly and upwardly to the pin 15 of the plate 14, so that an animal walking up the way 34 will be enabled to step onto, and proceed down, plate 14. In order to prevent his return, however, the plate 35 is provided and pivoted at its front end to the pin 36, while its rear end lies upon the spindle or pin 15. Thus the victim may walk up way 34 and raise plate 35, to permit his passage, but as the plate gravitates back he will be unable to raise it when attempting to retrace his movements. 37 indicates a grating which is arranged above the spindle 36 and which operates to close the space above the same.

Located over the opening or slot 13 is the cap-plate or cover 38, which is provided with the slots 39 and 13. Slot 13 is provided for the passage of the wire 12, while it is the purpose of slot 39 to admit air and light into the body of the trap.

To use my invention, the bait box is filled with a suitable bait and the door 4 opened. This will result in a downward movement of the rear arm of lever 7, and a consequent locking of plate 14 in a lowered position, owing to the operations of bar 23, as before explained. The game is attracted into the trap by means of the bait, and in his endeavors to get the same treads upon the lever 28, which results in a release of bar 23 from the stud 25. This is followed by the dropping of the door, because of its superior weight, whereupon the game is captured. Upon finding himself so confined, the game will find his way up the incline 34, and will pass by the plate 35 and onto the plate 14. When the door closes, this plate 14 is raised, as will be understood, and upon receiving the weight of the victim the plate is returned to its first position, at which bar 23 is locked with stud 25, and the trap again set. The victim is, however, prevented from returning to the now open-door chamber by means of plate 35, but will, in his efforts to escape, pass plate 18 and enter compartment 19, in which he will be compelled to remain until removed by way of gate 41. This gate is hinged at 42 and formed in the left-hand side of the body. After the game has entered upon the plate 14, the trap will be reset, so as to be in condition for capturing a second victim, and this operation may continue indefinitely.

Having described my invention, what I claim, and desire to secure by Letters Patent, is—

An animal trap consisting of a body-portion, a lever pivoted to the upper side thereof, a door vertically-movable and connected to one end of the lever, a plate pivoted at one end and projecting rearwardly from its pivot and connected at its free end to the remaining end of the lever, a rod pivotally connected to the said plate and projecting forwardly therefrom, said rod having a notch on its under side adapted to receive a stud rigid with the body, whereby the plate may be locked in a predetermined position, a second lever fulcrumed within the body and adapted to operate with the rod of the swinging plate and to be capable, upon the entry of the victim, of disengaging the stud and recess aforesaid, and a partition interposed between the door and the swinging plate, said partition being capable of allowing the victim to pass from the door to the swinging plate and of preventing his return, whereby as the victim enters the trap he may disengage the swinging rod from its stud and allow the door to close and whereby he may pass the partition and depress the swinging plate, thus opening the door and resetting the trap, substantially as described.

In testimony that I claim the foregoing as my own I have hereto affixed my signature in the presence of two witnesses.

EMANUEL PETERS.

Witnesses:
N. M. DOUDNA,
IRVING W. CRARY.